United States Patent
Osawa et al.

(10) Patent No.: US 9,080,075 B2
(45) Date of Patent: Jul. 14, 2015

(54) COATING EMULSION COMPOSITION, AND WATER/OIL-REPELLENT PAPER AND MAKING METHOD

(75) Inventors: Yoshihito Osawa, Annaka (JP); Kenji Yamamoto, Annaka (JP); Yasunori Watanabe, Tokyo (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 1408 days.

(21) Appl. No.: 12/628,657

(22) Filed: Dec. 1, 2009

(65) Prior Publication Data

US 2010/0075159 A1 Mar. 25, 2010

Related U.S. Application Data

(62) Division of application No. 11/907,358, filed on Oct. 11, 2007, now abandoned.

(30) Foreign Application Priority Data

Oct. 13, 2006 (JP) .................................. 2006-279800
Oct. 13, 2006 (JP) .................................. 2006-279815

(51) Int. Cl.

| D06M 13/50 | (2006.01) |
|---|---|
| D06M 15/263 | (2006.01) |
| C08K 3/36 | (2006.01) |
| C08G 77/14 | (2006.01) |
| C08L 83/06 | (2006.01) |
| C08L 83/07 | (2006.01) |
| C09D 183/04 | (2006.01) |
| C08J 3/03 | (2006.01) |
| D21H 19/32 | (2006.01) |
| C08K 5/544 | (2006.01) |
| D21H 19/16 | (2006.01) |
| D21H 19/62 | (2006.01) |
| D21H 21/16 | (2006.01) |

(52) U.S. Cl.
CPC ................ C09D 183/04 (2013.01); C08J 3/03 (2013.01); D21H 19/32 (2013.01); C08J 2383/04 (2013.01); C08K 5/544 (2013.01); C08L 83/06 (2013.01); D21H 19/16 (2013.01); D21H 19/62 (2013.01); D21H 21/16 (2013.01)

(58) Field of Classification Search
USPC ......... 106/287.11; 252/8.61, 8.62; 280/728.1; 427/224, 387; 428/219, 447; 524/188, 524/492, 503, 506, 730, 731, 837, 847; 525/56, 58, 478; 528/28, 33; 556/413, 556/425

See application file for complete search history.

(56) References Cited

U.S. PATENT DOCUMENTS

| 4,606,951 | A | * | 8/1986 | Wakasugi et al. ............ 428/34.3 |
|---|---|---|---|---|
| 5,140,061 | A | | 8/1992 | Feder |
| 5,254,621 | A | | 10/1993 | Inoue et al. |
| 5,827,921 | A | | 10/1998 | Osawa et al. |
| 6,140,414 | A | | 10/2000 | Ohsawa et al. |
| 6,140,447 | A | * | 10/2000 | Gay et al. ........................ 528/15 |
| 7,964,062 | B2 | * | 6/2011 | Yamamoto et al. ........ 162/164.4 |
| 2006/0089427 | A1 | * | 4/2006 | Yamamoto et al. ............. 524/42 |
| 2006/0121300 | A1 | | 6/2006 | Matsumura |

FOREIGN PATENT DOCUMENTS

| DE | 2449085 A1 | 4/1976 |
|---|---|---|
| JP | 5-98579 A | 4/1993 |
| JP | 8-85760 A | 4/1996 |
| JP | 8-209590 A | 8/1996 |
| JP | 9897994 A | 3/1997 |
| JP | 9-208826 A | 8/1997 |
| JP | 2000-34410 A | 2/2000 |
| JP | 2001-55510 A | 2/2001 |
| JP | 2004-161922 A | 6/2004 |
| JP | 2005-330623 A | 12/2005 |
| JP | 2006-257159 A | 9/2006 |

OTHER PUBLICATIONS

European Search Report for Application No. 07253955.4, mailed Apr. 15, 2009.
Japanese Office Action dated Apr. 27, 2011 for Application No. 2006-279815.

* cited by examiner

*Primary Examiner* — Ling Choi
*Assistant Examiner* — Chun-Cheng Wang
(74) *Attorney, Agent, or Firm* — Birch, Stewart, Kolasch & Birch, LLP

(57) ABSTRACT

An organopolysiloxane containing at least two silicon-bonded hydroxyl groups, the reaction product of an amino-containing organoalkoxysilane with a dicarboxylic anhydride, and an organopolysiloxane containing long-chain alkyl and alkoxy groups, but free of hydroxyl groups are emulsified and dispersed in water in the presence of a surfactant to form a coating emulsion composition.

3 Claims, No Drawings

COATING EMULSION COMPOSITION, AND WATER/OIL-REPELLENT PAPER AND MAKING METHOD

CROSS-REFERENCE TO RELATED APPLICATION

This application is a Divisional of application Ser. No. 11/907,358, filed on Oct. 11, 2007 now abandoned and for which priority is claimed under 35 U.S.C. §120. This application claims priority under 35 U.S.C. §119(a) to Japanese Application Nos. 2006-279800 and 2006-279815 filed in Japan on Oct. 13, 2006 and Oct. 13, 2006, respectively, the entire contents of which are hereby incorporated by reference.

TECHNICAL FIELD

This invention relates to a coating emulsion composition featuring uniformity of coating. It also relates to a water- and oil-repellent paper and a method for preparing the same, the paper finding use in food packages and wrappers including base paper and wrappers for chocolate and snacks, paper boxes and bags for fried potato, fried chicken, doughnuts, crackers and cakes, and wrappers for hamburgers and fried items.

BACKGROUND ART

A number of cross-linking silicone emulsion compositions which cure into rubber coatings are known in the art, as disclosed in JP-A 5-98579 corresponding to U.S. Pat. No. 5,254,621, JP-A 8-85760, JP-A 9-208826 corresponding to U.S. Pat. No. 5,827,921, JP-A 2000-34410 corresponding to U.S. Pat. No. 6,140,414, and JP-A 2001-55510. Effective coating treatment is possible when these compositions are applied to fabrics, building members, and other substrates having an irregular surface. Problems arise, however, when they are applied to films, paper sheets, and other substrates having a relatively smooth surface to form a thin coating thereon. The coating weight will vary during the coating step, failing to form a coating having a uniform thickness.

Water- and oil-repellent paper sheets having a function of restraining oil penetration are commonly utilized as food packages and wrappers for packaging or wrapping oily food items such as fried items and oil and fat-containing foods. These water- and oil-repellent paper sheets are not only desired to be fully water- and oil-repellent, but must also be safe. A number of proposals are known in the art. Recently, those water- and oil-repellent paper sheets having organic fluororesins incorporated therein drew a concern about safety. As a substitute, those paper sheets having a water- and oil-repellent layer formed on a paper substrate were proposed as disclosed in JP-A 8-209590 and JP-A 9-87994.

As compared with the prior art water- and oil-repellent paper sheets having organic fluororesins incorporated therein, those paper sheets having a water- and oil-repellent layer formed on a paper substrate for insuring safety are difficult to provide a sufficient level of water and oil repellency. It is pointed out that particularly when the paper sheets are folded for use as boxes or base sheets, the folded portions suffer from noticeable losses of water and oil repellency.

DISCLOSURE OF THE INVENTION

A first object of the invention is to provide a coating emulsion composition featuring uniformity of coating.

A second object is to provide a water- and oil-repellent paper having improved water and oil repellency, experiencing little losses of water and oil repellency at folds when folded, and having release and safety features, and a method for preparing the same.

The first object is attained by a coating emulsion composition which is obtained by emulsifying and dispersing components (A) to (F), defined below, in water in the presence of a surfactant because the resulting coating emulsion composition is improved in the uniformity of coating.

In the first aspect, the invention provides a coating emulsion composition comprising
- (A) 100 parts by weight of an organopolysiloxane containing at least two silicon-bonded hydroxyl groups in a molecule,
- (B) 0.5 to 20 parts by weight of the reaction product of an amino-containing organoalkoxysilane with a dicarboxylic anhydride,
- (C) 0 to 20 parts by weight of an epoxy-containing organoalkoxysilane and/or a partial hydrolyzate thereof,
- (D) 0 to 50 parts by weight of colloidal silica and/or polysilsesquioxane,
- (E) 0 to 10 parts by weight of a curing catalyst, and
- (F) 0.5 to 20 parts by weight of an organopolysiloxane containing long-chain alkyl and alkoxy groups, but free of hydroxyl groups, components (A) to (F) being emulsified and dispersed in water in the presence of a surfactant.

A coating resulting from the coating emulsion composition is uniform and fully adherent to any underlying substrate. When fibers, paper, film, leather and building materials are treated with the composition, the resultant coating imparts water repellency, water-proof and parting properties. Best results are obtained when substrates with a less irregular surface are coated. The composition can also be used as a binder for functional inorganic fillers such as photocatalysts.

Coating treatment with the inventive composition provides a uniform coating without variations.

An embodiment of the invention that attains the second object is a water- and oil-repellent paper sheet having improved fold resistance, the paper sheet comprising a paper substrate and a water- and oil-repellent, releasable silicone resin layer on at least one surface of the paper substrate. Provided that the paper sheet includes a planar portion normally and a folded portion when folded, the planar portion exhibits an oil resistance which is at least 9 in Kit value and the folded portion exhibiting an oil resistance which is at least 8 in Kit value, both as measured at 20° C. and a humidity 50% by J. TAPPI paper/pulp test No. 41-83, and the planar portion exhibiting a water repellency which is at least R8 and the folded portion exhibiting a water repellency which is at least R7, both as measured by J. TAPPI paper/pulp test No. 68:2000.

Since the paper sheet of the invention has a silicone resin layer having water and oil repellency and release property, it exhibits improved water and oil repellency normally. Even when it is folded, the folded portion experiences little losses of water and oil repellency. The paper sheet thus finds use in food packages and wrappers including base paper and wrappers for chocolate and snacks, paper boxes and bags for fried potato, fried chicken, doughnuts, crackers and cakes, and wrappers for hamburgers and fried items.

The invention also provides a method for preparing a water- and oil-repellent paper sheet, comprising coating a water- and oil-repellent composition primarily comprising an aqueous silicone resin emulsion on at least one surface of a paper substrate so as to give a dry coating weight of at least 1.0 g/m², for thereby forming a water- and oil-repellent, releasable silicone resin layer. The paper substrate is selected from among kraft paper, wood-free paper, paper board, liner, glassine paper and parchment paper.

By coating a surface of a paper substrate with a water- and oil-repellent composition primarily comprising an aqueous silicone resin emulsion, a paper sheet with improved water and oil repellency is easily prepared.

The paper sheet of the invention has improved water and oil repellency due to the silicone resin layer having water and oil repellency and release property, and even when folded, maintains the repellency with little losses or at the practically acceptable level in the folded portion. Thus the water- and oil-repellent paper sheet is useful in commercial food packages and wrappers for packaging or wrapping a variety of oily food items such as fried items and oil and fat-containing foods.

DESCRIPTION OF THE PREFERRED EMBODIMENTS

In the disclosure, the notation (Cn-Cm) means a group containing from n to m carbon atoms per group. All parts are by weight unless otherwise stated.

First Embodiment

Described below are components in the coating emulsion composition according to the first embodiment of the invention.

Component (A) is an organopolysiloxane containing at least two silicon-bonded hydroxyl groups in a molecule, and typically an organopolysiloxane having the average compositional formula (1):

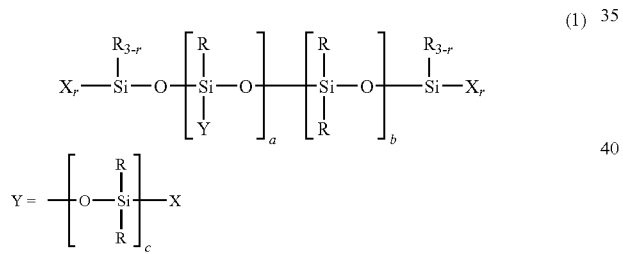

Herein R is each independently a $C_1$-$C_{20}$ alkyl group or a $C_6$-$C_{20}$ aryl group. X is each independently a $C_1$-$C_{20}$ alkoxy group or a hydroxyl group, with the proviso that at least two X's are hydroxyl groups. The subscript "a" is 0 or a positive number of $0 < a \le 1,000$, "b" is a positive number of $100 \le b \le 10,000$, "c" is 0 or a positive number of $0 < c \le 1,000$, $100 \le a \times c + b \le 100,000$, and r is 1, 2 or 3.

Specifically, R is each independently selected from $C_1$-$C_{20}$ alkyl groups and $C_6$-$C_{20}$ aryl groups, for example, chain-like alkyl groups such as methyl, ethyl, propyl, butyl, pentyl, hexyl, heptyl, octyl, nonyl, decyl, dodecyl, tetradecyl, hexadecyl, and octadecyl, cycloalkyl groups such as cyclopentyl, cyclohexyl and cycloheptyl, and aryl groups such as phenyl, tolyl and naphthyl, with methyl being preferred. X is each independently selected from $C_1$-$C_{20}$, preferably $C_1$-$C_6$ alkoxy groups and hydroxyl groups, and examples of suitable alkoxy groups include methoxy, ethoxy, propoxy, butoxy and pentoxy groups.

If "a" is in excess of 1,000, the resulting coating has an insufficient strength. Thus "a" is 0 or a positive number from more than 0 to 1,000, and preferably a positive number from more than 0 to 200. If "b" is less than 100, the resulting coating becomes less flexible. If "b" is in excess of 10,000, the resulting coating lowers in tear strength. Thus "b" is a positive number from 100 to 10,000, and preferably a positive number from 1,000 to 5,000. Preferably "c" is a positive number from 1 to 1,000. It is noted that in view of crosslinking, the organopolysiloxane (A) should contain at least two silicon-bonded hydroxyl groups in a molecule.

Examples of the organopolysiloxane (A) include those of the following formulae (i) to (vi).

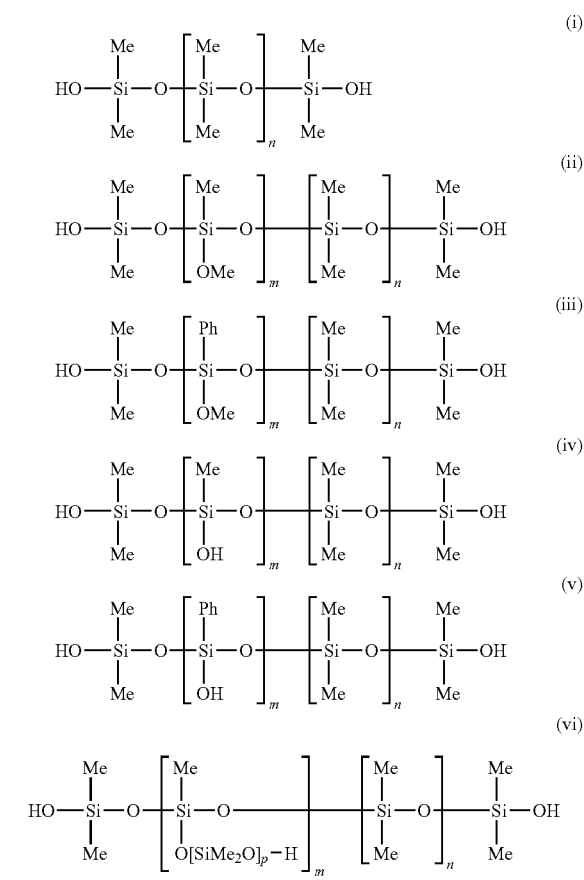

Herein Me stands for methyl, and Ph stands for phenyl. The subscript "m" is 0 or a positive number of $0 < m \le 1,000$, and preferably $0 < m \le 200$; n is a positive number of $100 \le n \le 10,000$, and preferably $1,000 \le n \le 5,000$; and p is 0 or a positive number of $0 < p \le 1,000$, and preferably $1 \le p \le 1,000$.

The organopolysiloxane can be prepared by well-known techniques. For example, it may be prepared through equilibration reaction between a cyclic siloxane such as octamethylcyclotetrasiloxane and an α,ω-dihydroxysiloxane oligomer in the presence of a catalyst such as metal hydroxides. Since component (A) is preferably used in emulsion form, it may be obtained as an emulsion by a well-known emulsion polymerization technique. Specifically, it may be readily prepared by previously emulsifying and dispersing a cyclic siloxane and a α,ω-dihydroxysiloxane oligomer, α,ω-dialkoxysiloxane oligomer or alkoxysilane in water with the aid of an anionic or cationic surfactant, optionally adding a catalyst such as an acidic or alkaline material, and effecting polymerization reaction.

The emulsion is preferably prepared by emulsifying and dispersing the organopolysiloxane as mentioned above in an aqueous medium in the presence of at least one anionic surfactant selected from organic sulfonic acids, organic sulfates and organic sulfonates to form an initial emulsion, causing the initial emulsion to polymerize, and neutralizing. The emulsion is preferably formed to an average particle size of up to 500 nm, and more preferably up to 400 nm. With a particle size in excess of 500 nm, the emulsion becomes unstable and slow in polymerization reaction, requiring a longer process time.

For polymerization of the emulsion, the polymerization temperature is preferably between 0° C. and 90° C., and more preferably between 5° C. and 80° C. A temperature below 0° C. may retard the polymerization reaction whereas above 90° C., the emulsion may lose stability during the polymerization reaction. The time for polymerization reaction is preferably 1 to 200 hours, and more preferably 5 to 100 hours. Preferably the polymerization reaction proceeds under static holding or with moderate stirring.

After the completion of polymerization reaction, the system is neutralized, preferably at pH 4 to 9 by adding an alkaline material. If the pH is below 4 or above 9, the resulting organopolysiloxane emulsion may become low in long-term stability. The more preferred pH range is pH 5 to 8. Examples of the alkaline material to be added include inorganic alkaline compounds such as alkali metal hydroxides, alkaline earth metal hydroxides, alkali metal carbonates and alkaline earth metal carbonates, and organic alkaline compounds such as ammonia and organic amines.

To enhance the stability of the organopolysiloxane emulsion obtained by emulsion polymerization as component (A), any of other anionic surfactants, nonionic surfactants and ampholytic surfactants may be added prior to or subsequent to the emulsion polymerization, or subsequent to neutralization as long as the object of the invention is not impaired. Suitable anionic surfactants include salts of higher alkyl sulfates, salts of alkyl phenyl ether sulfates, salts of alkylbenzenesulfonic acids, salts of higher alkyl phosphates, salts of ethoxylated higher alkyl sulfates, salts of ethoxylated alkyl phenyl ether sulfates, and salts of ethoxylated higher alkyl phosphates. Suitable nonionic surfactants include ethoxylated higher alcohols, ethoxylated alkyl phenols, polyhydric alcohol fatty acid esters, ethoxylated polyhydric alcohol fatty acid esters, ethoxylated fatty acids, ethoxylated fatty acid amides, sorbitol, sorbitan fatty acid esters, ethoxylated sorbitan fatty acid esters, and sucrose fatty acid esters. Suitable ampholytic surfactants include amino acid and betaine surfactants.

Component (B) is the reaction product of an amino-containing organoalkoxysilane with a dicarboxylic anhydride. It is effective for enhancing the adhesion of a silicone coating to a substrate. It is obtained by reacting an amino-containing organoalkoxysilane with a dicarboxylic anhydride. One reactant, amino-containing organoalkoxysilane is an organoalkoxysilane having the general formula:

$$A(R)_g Si(OR)_{3-g}$$

wherein R is as defined above, A is an amino-containing group of —$R^3(NHR^3)_hNHR^4$ (wherein $R^3$ is each independently a $C_1$-$C_6$ divalent hydrocarbon group, $R^4$ is R or hydrogen, h is an integer of 0 to 6), and g is 0, 1 or 2, that is, an organoalkoxysilane containing an unsubstituted amino group (i.e., —$NH_2$) or substituted amino group (i.e., —$NHR^4$). Illustrative examples of the organoalkoxysilane are given below.

$(C_2H_5O)_3SiC_3H_6NH_2$ $(C_2H_5O)_2(CH_3)SiC_3H_6NH_2$ $(CH_3O)_3SiC_3H_6NH_2$ $(CH_3O)_2(CH_3)SiC_3H_6NH_2$ $(CH_3O)_3SiC_3H_6NHC_2H_4NH_2$ $(CH_3O)_2(CH_3)SiC_3H_6NHC_2H_4NH_2$

Examples of the dicarboxylic anhydride to be reacted with the amino-containing organoalkoxysilane include maleic anhydride, phthalic anhydride, succinic anhydride, methylsuccinic anhydride, glutaric anhydride, and itaconic anhydride. Of these, maleic anhydride is preferred. The reaction may be readily carried out by combining the amino-containing organoalkoxysilane and the dicarboxylic anhydride in such a ratio that the molar ratio of amino group to acid anhydride may range from 0.5:1 to 2:1, and mixing them at room temperature or elevated temperature, optionally in a hydrophilic organic solvent. Suitable hydrophilic organic solvents include alcohols such as methanol, ethanol, isopropanol and butanol, ketones such as acetone and methyl ethyl ketone, acetonitrile, tetrahydrofuran, and the like.

Component (B) is compounded in an amount of 0.5 to 20 parts by weight per 100 parts by weight of component (A). Less than 0.5 part of component (B) is less effective in enhancing substrate adhesion whereas more than 20 parts of component (B) gives a coating which is hard and brittle. The preferred amount is 1 to 10 parts.

Component (C) is an epoxy-containing organoalkoxysilane and/or a partial hydrolyzate thereof. It is effective for enhancing the adhesion of a silicone coating to a substrate. Examples include γ-glycidoxypropyltrimethoxysilane, γ-glycidoxypropyldimethoxymethylsilane, β-(3,4-epoxycyclohexyl)ethyltrimethoxysilane, and β-(3,4-epoxycyclohexyl)ethyldimethoxymethylsilane. Component (C) is compounded in an amount of 0 to 20 parts by weight per 100 parts by weight of component (A). More than 20 parts of component (C) gives a coating which is hard and brittle. The preferred amount is 1 to 10 parts.

Component (D) is colloidal silica and/or polysilsesquioxane and is added as a film reinforcement. Examples include colloidal silica and polymethylsilsesquioxane which is a hydrolytic condensate of trimethoxymethylsilane. The type of colloidal silica is not limited. Typical are those having a particle size of 5 to 50 nm and stabilized with sodium, ammonia or aluminum. The colloidal silica which can be used herein is commercially available under the trade name of Snowtex from Nissan Chemical Industries Ltd., Ludox from W. R. Grace & Co., Silicadol from Nippon Chemical Industrial Co., Ltd., Adelite AT from Asahi Denka Kogyo K.K., and Cataloid S from Catalysts & Chemicals Industries Co., Ltd.

The polymethylsilsesquioxane is obtained by adding a condensation catalyst selected from acids such as sulfuric acid and alkaline compounds such as potassium hydroxide to an aqueous solution of a surfactant, adding dropwise trimethoxymethylsilane thereto, and agitating the solution for emulsification, thereby yielding an emulsion containing polymethylsilsesquioxane. It is acceptable to add an alkoxytrialkylsilane, dialkoxydialkylsilane or tetraalkoxysilane during the process for adjusting the degree of crosslink of polysilsesquioxane. It is also acceptable to add a vinylsilane, epoxysilane, acrylic silane or methacrylic silane for increasing the reactivity of polysilsesquioxane. Component (D) is compounded in an amount of 0 to 50 parts by weight per 100 parts by weight of component (A). More than 50 parts of component (D) gives a silicone coating which is hard and brittle. The preferred amount is 1 to 30 parts and more preferably 2 to 25 parts. Component (D) preferably has a particle size of 2 to 200 nm.

Component (E) is a curing catalyst which promotes condensation reaction of components in the composition to effect crosslinking and curing. Suitable catalysts include metal salts of organic acids such as dibutyltin dilaurate, dibutyltin dioctate, dioctyltin dilaurate, dioctyltin diversatate, dioctyltin diacetate, dibutyltin bisoleylmalate, tin octylate, zinc stearate, zinc octylate, zinc acetate, and iron octylate; and amine compounds such as n-hexylamine and guanidine. Except for those catalysts which are water soluble, desirably the curing catalysts are previously converted to emulsion form by emulsifying and dispersing them in water with the aid of a surfactant. Component (E) is compounded in an amount of 0 to 10 parts and preferably 0 to 5 parts by weight per 100 parts by weight of component (A). If the amount of component (E) is more than 10 parts, the catalyst component which is left in the coating as nonvolatile matter can adversely affect the characteristics of a coating. Even when the amount of component (E) is zero, crosslinking reaction will proceed because the reaction product of an amino-containing organoalkoxysilane with a dicarboxylic anhydride as component (B) can serve as a co-catalyst. Addition of component (E) in an amount of up to 10 parts, and preferably up to 5 parts allows the curing rate and the characteristics of a coating to be regulated.

Component (F) is an organopolysiloxane containing long-chain (preferably $C_4$-$C_{20}$) alkyl and alkoxy groups, but free of hydroxyl groups, and is compounded for improving coating uniformity during coating operation. Preferably, component (F) is an organopolysiloxane having the average compositional formula (2).

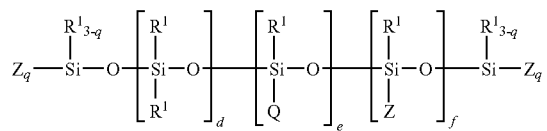

(2)

Herein $R^1$ is each independently $C_1$-$C_3$ alkyl or phenyl, Q is each independently $C_4$-$C_{20}$ alkyl, Z is each independently a group of —$OR^2$, —$C_2H_4$—$Si(OR^2)_3$ or —$C_3H_6$—$Si(OR^2)_3$ wherein $R^2$ is $C_1$-$C_6$ alkyl, the subscript d is a positive number of 1 to 100, e is a positive number of 1 to 100, f is a positive number of 0.1 to 30, and q is 0, 1, 2 or 3.

Specifically, $R^1$ is each independently phenyl or a $C_1$-$C_3$ alkyl group, examples of which include methyl, ethyl and propyl, with methyl being preferred. Q is each independently a $C_4$-$C_{20}$ alkyl group, for example, butyl, pentyl, hexyl, heptyl, octyl, nonyl, decyl, dodecyl, tetradecyl, hexadecyl and octadecyl. Of these, hexyl, octyl, decyl and dodecyl are preferred. Z is each independently a group of —$OR^2$, —$C_2H_4$—$Si(OR^2)_3$ or —$C_3H_6$—$Si(OR^2)_3$ wherein $R^2$ is a $C_1$-$C_6$ alkyl group. Examples of Z include methoxy, ethoxy, propoxy, butoxy, pentyloxy, hexyloxy, —$C_2H_4$—$Si(OCH_3)_3$, —$C_2H_4$—$Si(OC_2H_5)_3$, —$C_3H_6$—$Si(OCH_3)_3$, —$C_3H_6$—$Si(OC_2H_5)_3$, etc. Of these, methoxy, ethoxy and —$C_2H_4$—$Si(OCH_3)_3$ are preferred.

Of the organopolysiloxanes having the average compositional formula (2), those having the average compositional formula (3) are more preferred.

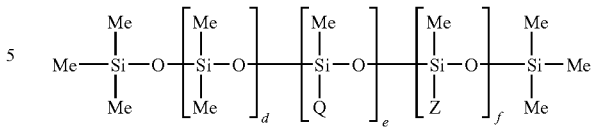

(3)

Herein Q is each independently selected from hexyl, octyl, decyl, and dodecyl, Z is each independently selected from methoxy, ethoxy and —$C_2H_4$—$Si(OCH_3)_3$, the subscript d is a positive number of 1 to 100, e is a positive number of 1 to 100, and f is a positive number of 0.1 to 30.

From the standpoint of coating uniformity, d is a positive number of 1 to 100, e is a positive number of 1 to 100, and f is a positive number of 0.1 to 30; and preferably d is a positive number of 2 to 90, e is a positive number of 2 to 90, and f is a positive number of 0.1 to 20.

Component (F) is compounded in an amount of 0.5 to 20 parts by weight per 100 parts by weight of component (A). Less than 0.5 part of component (F) is ineffective for imparting coating uniformity whereas more than 20 parts interferes with curing of a coating and adversely affects coating properties. The preferred amount of component (F) is 1 to 15 parts, and more preferably 1 to 10 parts by weight per 100 parts by weight of component (A).

A surfactant (G) is used to keep the foregoing components in emulsion form. It is not particularly limited. Suitable surfactants include anionic surfactants, for example, alkyl sulfates, alkylbenzenesulfonates, and alkyl phosphates (i.e., salts); nonionic surfactants, for example, polyoxyethylene alkyl ethers, polyoxyethylene alkyl phenyl ethers, and polyoxyethylene fatty acid esters; cationic surfactants, for example, quaternary ammonium salts and alkylamine acetates; and ampholytic surfactants, for example, alkyl betaine and alkylimidazoline compounds. Also useful are water-soluble polymers such as polyvinyl alcohol.

The coating emulsion composition of the invention may be prepared by emulsifying and dispersing the foregoing components (A) to (F) in water in the presence of surfactant (G). The emulsifying and dispersing step to produce an emulsion composition is desirably conducted under a high shear pressure of at least 10 MPa using a high-pressure emulsifying machine, typically homogenizer. If the pressure is below 10 MPa, it may be difficult to produce an emulsion having an average particle size of up to 500 nm. A shear pressure in excess of 200 MPa is inefficient because the effect of further reducing the average particle size is not expected. The preferred shear pressure is 15 to 150 MPa and more preferably 20 to 100 MPa. Prior to this high-pressure emulsification, preliminary emulsification may be conducted, if desired, using a homomixer, Agi-Homo-Mixer (Primix Corp.), Combi-Mix (Primix Corp.), Supraton (trade name), Clear-Mix (M Technique), colloid mill or the like. Similar emulsifying and dispersing techniques are applicable in an embodiment wherein components (A) to (F) are individually prepared as separate emulsions before they are combined together.

The method of coating a substrate with the coating emulsion composition of the invention is not particularly limited. The composition is applied to a substrate by any of well-known coating techniques including brush coating, roll coating, gravure coating, bar coating, spraying, knife coating, and dipping, and thereafter, water is evaporated off, yielding a silicone coating. For improving the efficiency of coating operation, a thickener or the like may be added to the composition to adjust the viscosity thereof. Suitable thickeners include carboxymethyl cellulose, sodium polyacrylate, starch, casein, cellulose acetate, hydroxyethyl cellulose, and polyvinyl alcohol.

The coating emulsion composition of the invention may be used as a water repellent, anti-water-absorbing agent, release agent, or anti-fouling agent to be applied to films, paper sheets and the like, but its use is not limited thereto.

Second Embodiment

Next, the water- and oil-repellent paper sheet according to the second embodiment of the invention is described.

The water- and oil-repellent paper sheet includes a water- and oil-repellent, releasable silicone resin layer on at least one surface of a paper substrate.

The paper substrate used herein is not particularly limited. A choice of paper may be made depending on a particular application as long as a silicone resin layer can be formed on at least one surface thereof. Suitable paper substrates include kraft paper, wood-free paper, paper board, liner, glassine paper, and parchment paper. The fibrous material of which the paper substrate is made is not limited to cellulose and cellulose derivatives. Also, instead of paper substrates, woven fabrics and non-woven fabrics comprising fibers derived from raw materials other than cellulose and cellulose derivatives may be used as the substrate.

The silicone resin layer or coating has not only good water repellency and release characteristic of silicone, but also good film strength and oil repellency due to a three-dimensional crosslinked structure characteristic of resin. Because of this nature, it can impart oil repellency, water repellency and release at the same time. Since the silicone resin is more flexible than other organic resins, it forms a coating having good fold resistance. Then the paper sheet maintains good oil and water repellency even when folded.

For convenience of description, the paper sheet includes a planar portion normally and a folded portion when folded. Since the water- and oil-repellent paper sheet of the invention has a silicone resin layer featuring flexibility, oil repellency, water repellency and releasability, it exhibits improved oil resistance and water repellency as demonstrated below. The planar portion exhibits an oil resistance which is at least 9 in Kit value and the folded portion exhibits an oil resistance which is at least 8 in Kit value, both as measured at a temperature 20° C. and a humidity 50% by J. TAPPI paper/pulp test No. 41-83. This indicates that oil resistance is little reduced by folding. Also, the planar portion exhibits a water repellency which is at least R8 and the folded portion exhibits a water repellency which is at least R7, both as measured by J. TAPPI paper/pulp test No. 68:2000. This indicates that water repellency is little reduced by folding.

The water- and oil-repellent paper sheet may be prepared by coating a water- and oil-repellent composition primarily comprising an aqueous silicone resin emulsion on at least one surface of a paper substrate so as to give a dry coating weight of at least 1.0 g/m$^2$, and preferably a dry coating weight of 1.0 to 4.0 g/m$^2$ sufficient to ensure water and oil repellency and to maintain paper flexibility, with a dry coating weight of 1.0 to 2.0 g/m$^2$ being more preferred from a commercial standpoint. It is noted that an appropriate coating weight may vary with the type of paper substrate and a particular application.

The coating operation may be conducted in an ordinary way using any desired applicator such as a calendar roll, size press roll, roll coater, blade coater, air knife coater, bar coater, and gravure coater. The number of coating steps may be determined appropriate in accordance with a coating weight of one pass and the final coating weight. The buildup of the water- and oil-repellent composition on the paper substrate is then dried, for example, at a temperature of 80 to 160° C. for 20 seconds to 2 minutes whereby the composition is cured simultaneously, forming a silicone resin layer. The silicone resin layer generally has a thickness of about 1 μm to about 4 μm.

Described below is the water- and oil-repellent composition used to form the silicone resin layer on the paper substrate. From the safety aspect, the composition is preferably a silicone-based water- and oil-repellent composition primarily comprising an aqueous silicone resin emulsion, and specifically an aqueous silicone resin emulsion comprising components (a) to (e):

(a) 100 parts by weight of an organopolysiloxane containing at least two silicon-bonded hydroxyl groups in a molecule,
(b) 0.5 to 20 parts by weight of a dicarboxylic acid base curing agent,
(c) 1 to 50 parts by weight of silica,
(d) 2 to 4 parts by weight of an organopolysiloxane containing long-chain alkyl and alkoxy groups, but free of hydroxyl groups, and
(e) an effective amount to form an emulsion of a surfactant,
because the resulting coating has improved oil repellency, water repellency, release and flexibility.

Component (a) is an organopolysiloxane containing at least two, preferably 2 to 200, silicon-bonded hydroxyl groups in a molecule. The organopolysiloxane has a main skeleton of polysiloxane which is a generally linear structure having a degree of polymerization of 100 to 10,000, and may be branched to such an extent that the flexibility of a resultant coating is not compromised. If the degree of polymerization is less than 100, the coating becomes poor in oil repellency when folded. If the degree of polymerization is more than 10,000, the coating becomes less oil repellent. The preferred degree of polymerization is 1,000 to 5,000.

The organopolysiloxane also contains organic groups attached to silicon atoms at ends and side chains, which include $C_1$-$C_{20}$ alkyl groups and $C_6$-$C_{20}$ aryl groups, and if partially, $C_1$-$C_{20}$ alkoxy groups. From the crosslinking standpoint, at least two silicon-bonded hydroxyl groups must be included per molecule. Illustrative examples of suitable organic groups include methyl, ethyl, propyl, butyl, pentyl, hexyl, heptyl, octyl, nonyl, decyl, dodecyl, tetradecyl, hexadecyl, octadecyl, cyclopentyl, cyclohexyl, cycloheptyl, phenyl, tolyl, and naphthyl, with methyl being preferred. Suitable alkoxy groups include methoxy, ethoxy, propoxy, butoxy, hexyloxy, heptyloxy, octyloxy, decyloxy, and tetradecyloxy.

Examples of organopolysiloxane (a) may be the same as component (A) and include those of formulae (i) to (vi).

Component (b) is a dicarboxylic acid curing agent which serves as a crosslinker for forming a cured silicone coating and also serves to improve adhesion to the substrate. The dicarboxylic acid curing agent is typically selected from dicarboxylic anhydrides and reaction products thereof.

Examples of the dicarboxylic anhydride include oxalic anhydride, maleic anhydride, phthalic anhydride, succinic anhydride, and methylsuccinic anhydride.

The dicarboxylic anhydride may be used as its reaction product with an alkaline compound for further improving solubility or with a silane coupling agent for improving adhesion to the substrate. Examples of the silane coupling agent used herein include alkyl silicates such as tetraethyl silicate, and organoalkoxysilanes, for example, alkylalkoxysilanes such as methyltriethoxysilane, alkenyl-containing alkoxysilanes such as vinyltriethoxysilane, amino-containing alkoxysilanes such as 3-aminopropyltriethoxysilane, methacryloxy-containing alkoxysilanes such as methacryloxypropyltriethoxysilane, and condensates of the foregoing.

As component (b), examples of component (B) described earlier may be used.

Component (b) is compounded in an amount of 0.5 to 20 parts by weight per 100 parts by weight of component (a). Less than 0.5 part of component (b) is less effective in enhancing substrate adhesion whereas more than 20 parts of component (b) gives a coating which is hard and brittle and becomes less oil and water repellent when folded. The preferred amount is 1 to 10 parts.

Component (c) is silica and is added as a film reinforcement. Use may be made of silicas prepared by wet and dry processes and silicas commercially available as water dispersions. Although the type of silica is not limited, hydrophilic silicas are preferred. Preferred are silicas having a specific surface area of 10 to 1,000 $m^2/g$ as measured by the BET method and an average particle size for primary particles of 2 to 200 nm. Examples of silica used include AEROSIL (Nippon Aerosil Co., Ltd.), TOKUSIL (Tokuyama Co., Ltd.), NIPSIL (Tosoh Silica Co., Ltd.), and SYLYSIA (Fuji Sylysia Co., Ltd.). Colloidal silica of component (D) may also be used as component (c), examples of which include Snowtex (Nissan Chemical Industries Ltd.), Ludox (W. R. Grace & Co.), Silicadol (Nippon Chemical Industrial Co., Ltd.), Adelite AT (Asahi Denka Kogyo K.K.), and Cataloid S (Catalysts & Chemicals Industries Co., Ltd.).

Component (c) is compounded in an amount of 1 to 50 parts by weight per 100 parts by weight of component (a). If the amount of component (c) is less than 1 part, the coating has a low strength and poor oil repellency. More than 50 parts of component (c) gives a coating which is hard and brittle and becomes less oil repellent when folded. The preferred amount is 5 to 30 parts.

Component (d) is an organopolysiloxane containing long-chain alkyl and alkoxy groups, but free of hydroxyl groups, and serves to facilitate coating of the silicone base oil repellent composition. It improves leveling properties during coating, ensures to form a coating having improved flatness and uniformity, and eventually improves the performance of the resulting paper sheet.

This organopolysiloxane has a generally linear structure having a degree of polymerization of 5 to 260 and contain organic groups attached to silicon atoms at ends and side chains. The organic groups are mainly $C_1$-$C_3$ alkyl groups. For the effect of improving coating ability, the organopolysiloxane should contain per molecule 1 to 100, more preferably 1 to 80 long-chain alkyl groups of 4 to 20 carbon atoms, and 0.1 to 30, more preferably 1 to 30 $C_1$-$C_6$ alkoxy groups or $C_2$-$C_3$ alkyl groups having substituted thereon alkoxysilyl groups containing $C_1$-$C_6$ alkoxy groups.

Examples of the $C_1$-$C_3$ alkyl groups include methyl, ethyl, and propyl, with methyl being preferred. Examples of the long-chain alkyl groups of 4 to 20 carbon atoms include butyl, pentyl, hexyl, heptyl, octyl, nonyl, decyl, dodecyl, tetradecyl, hexadecyl, and octadecyl, with hexyl, octyl, decyl and dodecyl being preferred. Examples of the $C_1$-$C_6$ alkoxy groups include methoxy, ethoxy, propoxy, butoxy, pentyloxy, and hexyloxy. Examples of the $C_2$-$C_3$ alkyl groups having substituted thereon alkoxysilyl groups containing $C_1$-$C_6$ alkoxy groups include —$C_2H_4$—Si(OCH$_3$)$_3$, —$C_2H_4$—Si(OC$_2$H$_5$)$_3$, —$C_3H_6$—Si(OCH$_3$)$_3$, —$C_3H_6$—Si(OC$_2$H$_5$)$_3$, etc. Of these, methoxy, ethoxy and —$C_2H_4$—Si(OCH$_3$)$_3$ are preferred.

As component (d), examples of component (F) described earlier may be used.

Component (d) is compounded in an amount of 2 to 4 parts by weight per 100 parts by weight of component (a). Less than 2 parts is little effective for facilitating coating operation whereas more than 4 parts may adversely affect the oil repellency of a coating.

Component (e) is a surfactant which is used to keep the foregoing components in emulsion form. Its type is not particularly limited. Suitable surfactants include anionic surfactants, for example, alkyl sulfates, alkylbenzenesulfonates, and alkyl phosphates (i.e., salts); nonionic surfactants, for example, polyoxyethylene alkyl ethers, polyoxyethylene alkyl phenyl ethers, and polyoxyethylene fatty acid esters; and cationic surfactants, for example, quaternary ammonium salts and alkylamine acetates. Those as exemplified for component (G) are useful.

The amount of component (e) used is not particularly limited as long as it is effective to form an emulsion. Usually component (e) is used in an amount of 1 to 20 parts by weight per 100 parts by weight of component (a).

In the water- and oil-repellent composition, a catalyst for promoting condensation reaction of the foregoing components for curing may be added, if desired, in an amount of up to 10 parts, and more specifically up to 5 parts by weight per 100 parts by weight of component (a). The catalyst need not always be added because component (b) has such catalysis.

In the water- and oil-repellent composition, any of commercial silicone resin emulsions to be applied to paper substrates and clearing the food safety standards may be admixed insofar as the objects of the invention are not compromised. Also, defoamers or the like may be compounded in the silicone base water- and oil-repellent composition for improving the smoothness of a silicone resin layer or the like.

EXAMPLE

Examples and Comparative Examples are given below for further illustrating the invention, but the invention is not limited thereto. In Examples, all parts and percents are by weight.

Synthesis Example 1

A 2-L polyethylene beaker was charged with 498 g of octamethylcyclotetrasiloxane, 2 g of triethoxyphenylsilane, 50 g of 10% sodium laurylsulfate aqueous solution, and 50 g of 10% dodecylbenzenesulfonic acid aqueous solution. Using a homomixer, the components were emulsified uniformly, after which 400 g of water was slowly added for dilution. This was passed two times through a high-pressure homogenizer under a pressure of 30 MPa, obtaining a uniform white emulsion. The emulsion was transferred to a 2-L glass flask equipped with an agitator, thermometer, and reflux condenser where polymerization reaction was effected at 50° C. for 24 hours. It was allowed to mature at 10° C. for 24 hours before it was neutralized to pH 6.2 with 12 g of 10% sodium carbonate aqueous solution. This emulsion had a nonvolatile content of 45.4% after drying at 105° C. for 3 hours and contained an organopolysiloxane in a non-flowing soft gel form which had the average compositional formula shown below and was end-capped with hydroxyl groups. In this way, an emulsion (A-1) containing 44.4% of component (A) was obtained.

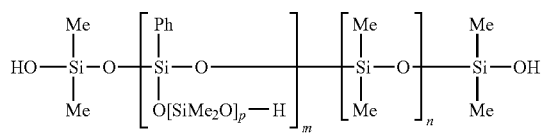

Herein Me stands for methyl, Ph stands for phenyl, m=1, and n+p=1,000.

Synthesis Example 2

A 2-L polyethylene beaker was charged with 500 g of octamethylcyclotetrasiloxane, 50 g of 10% sodium laurylsulfate aqueous solution, and 50 g of 10% dodecylbenzenesulfonic acid aqueous solution. Using a homomixer, the components were emulsified uniformly, after which 400 g of water was slowly added for dilution. This was passed two times through a high-pressure homogenizer under a pressure of 30 MPa, obtaining a uniform white emulsion. The emulsion was transferred to a 2-L glass flask equipped with an agitator, thermometer, and reflux condenser where polymerization reaction was effected at 50° C. for 24 hours. It was allowed to mature at 10° C. for 24 hours before it was neutralized to pH 6.2 with 12 g of 10% sodium carbonate aqueous solution. This emulsion had a nonvolatile content of 45.5% after drying at 105° C. for 3 hours and contained an organopolysiloxane in a gum form which had the formula: HO—[(CH$_3$)$_2$SiO]$_n$—H and a viscosity of more than 1,000 Pa-s. In this way, an emulsion (A-2) containing 44.5% of component (A) was obtained.

Synthesis Example 3

In 500 g of ethanol was dissolved 154 g of maleic anhydride. To the solution, 346 g of 3-aminopropyltriethoxy-silane was added dropwise at room temperature over one hour, followed by reaction for 24 hours under ethanol reflux at 80° C. This yielded a pale yellow clear solution (B-1) containing 50% of component (B). This solution had a nonvolatile content of 45.1% after drying at 105° C. for 3 hours. On analysis by IR, GC, NMR and GCMS, the reaction product in the solution consisted of about 60% of a mixture of compounds of the formulae:

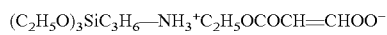

and the balance (about 40%) of oligomers derived therefrom.

Synthesis Example 4

A 2-L polyethylene beaker was charged with 300 g of dioctyltin dilaurate and 50 g of polyoxyethylene nonyl phenyl ether (EO 10 mole addition product), which were uniformly mixed by a homomixer. Water, 650 g, was slowly added to the mixture whereby the components were emulsified and dispersed in water. This was passed two times through a high-pressure homogenizer under a pressure of 30 MPa, yielding an emulsion (E-1) containing 30% of component (E).

Synthesis Example 5

A 2-L polyethylene beaker was charged with 500 g of an organopolysiloxane containing long-chain alkyl and alkoxy groups represented by the average compositional formula shown below, and having a dynamic viscosity of 37 mm$^2$/s, 20 g of polyoxyethylene decyl ether (EO 4 mole addition product), and 5 g of sodium sulfosuccinate, which were uniformly mixed by a homomixer. Water, 475 g, was slowly added to the mixture whereby the components were emulsified and dispersed in water. This was passed two times through a high-pressure homogenizer under a pressure of 30 MPa, yielding an emulsion (F-1) containing 50% of component (F).

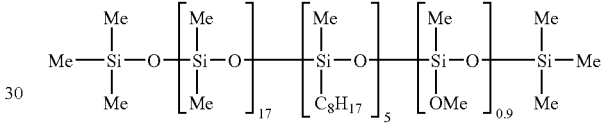

Examples 1-4 & Comparative Examples 1-3

Component (C) used was γ-glycidoxypropyltrimethoxysilane (C-1). Component (D) used was colloidal silica (Snowtex C, Nissan Chemical Industries Ltd., effective component 20%). A series of silicone emulsion compositions were prepared by mixing components (A) to (F) in accordance with the recipe (in amounts of neat components) of Table 1. Using a wire bar, the silicone emulsion compositions were coated onto white paper board to a net coating weight of 2 g/m$^2$, and the coating surface state (coated state) was visually observed. The coating was dried at 80° C. for one minute, after which the coating was examined for surface tack and adhesion to the substrate. The coating was also examined for release by attaching a pressure-sensitive adhesive tape to the coating surface and peeling the tape. The results are shown in Table 1.

TABLE 1

|  |  |  | Example | | | | Comparative Example | | |
|---|---|---|---|---|---|---|---|---|---|
|  |  |  | 1 | 2 | 3 | 4 | 1 | 2 | 3 |
| Composition based on neat component (pbw) | Component (A) | A-1 | 100 | 100 | 100 | — | 100 | 100 | 100 |
|  |  | A-2 | — | — | — | 100 | — | — | — |
|  | Component (B) | B-1 | 1 | 1 | 1.5 | 2 | 1 | 1 | 1 |
|  | Component (C) | C-1 | 1 | 1 | — | 2 | 1 | 1 | 1 |
|  | Component (D) | D-1 | 14 | 14 | 14 | 20 | 14 | 14 | 14 |
|  | Component (E) | E-1 | — | 0.3 | — | — | — | 0.3 | — |
|  | Component (F) | F-1 | 3 | 3 | 3 | 3 | — | — | 25 |
| Coated state *1 |  |  | ○ | ○ | ○ | ○ | X | X | ○ |

TABLE 1-continued

|  |  | Example | | | | Comparative Example | | |
|---|---|---|---|---|---|---|---|---|
|  |  | 1 | 2 | 3 | 4 | 1 | 2 | 3 |
| Coating | Tack *2 | ○ | ○ | ○ | ○ | ○ | ○ | X |
|  | Adhesion *3 | ○ | ○ | ○ | ○ | ○ | ○ | X |
|  | Release *4 | ○ | ○ | ○ | ○ | X | X | ○ |

*1 ○: even, X: uneven
*2 ○: tack-free, X: tack
*3 ○: coating does not peel off on finger rubbing, X: coating peels off on finger rubbing
*4 ○: light release, X: resistant to release due to local adhesion to substrate Example 5

The following components:
component (a): linear methylpolysiloxane (degree of polymerization 1,000, hydroxyl content 0.004 mole/100 g), 100 g
component (b): reaction product of maleic anhydride and 3-aminopropyltriethoxysilane (molar ratio=1/1), 1 g
component (c): untreated dry silica (BET surface area 200 m$^2$/g, primary average particle size 10 nm), 15 g
component (d): linear polysiloxane (degree of polymerization 30, organic groups attached to silicon atoms consisted of 10% octyl groups, 2% propoxy groups and the balance of methyl groups), 3 g
sodium laurylsulfate, 10 g
water, 129 g
were mixed together and uniformly emulsified on a homomixer to form a uniform white aqueous silicone resin emulsion. It was a silicone base water- and oil-repellent composition with 50% of effective components.

The paper substrate used was a white paper board (base paper) having a basis weight of 350 g/m$^2$ which had not been coated with a functional agent. Using a wire bar #5, the silicone base water- and oil-repellent composition was coated onto one surface of the base paper so as to give a dry coating weight of 1.5 to 2.0 g/m$^2$. The coating was dried and cured at 120° C. for 30 seconds to form a silicone resin layer. A water- and oil-repellent paper sheet was prepared in this way.

The water- and oil-repellent paper sheet was determined for oil resistance, water repellency and release by the following tests. The results are shown in Table 2.

Oil Resistance of Planar Portion:
The coated surface was measured according to J. TAPPI paper/pulp test No. 41-83 (Kit method). The measurement was by visual observation.

Oil Resistance of Folded Portion:
A paper sample was folded in two sections so that the coated surface faced outside. The folded portion was compressed from above under conditions: width 1.0 mm, depth 0.7 mm, and pressure 2.5 kgf/cm$^2$-sec, to define a complete fold. Then the paper sample was opened again, and the folded portion was measured for oil resistance according to J. TAPPI paper/pulp test No. 41-83 (Kit method). The measurement was by visual observation.

Water Repellency of Planar Portion:
The coated surface was measured according to J. TAPPI paper/pulp test No. 68:2000. The measurement was by visual observation.

Water Repellency of Folded Portion:
A paper sample was folded in two sections so that the coated surface faced outside. The folded portion was compressed from above under conditions: width 1.0 mm, depth 0.7 mm, and pressure 2.5 kgf/cm$^2$-sec, to define a complete fold. Then the paper sample was opened again, and the folded portion was measured for water repellency according to J. TAPPI paper/pulp test No. 68:2000. The measurement was by visual observation.

Release:
A 18 mm×35 mm piece of pressure-sensitive adhesive tape (Cellotape® by Nichiban Co., Ltd.) was attached to the coating surface and pressed thereto by rolling a tape roller of 2 kg one stroke. The assembly was held at 25° C. for one hour, after which the adhesive tape was manually peeled. The release property of the coated paper was rated "○" (smooth release) when the adhesive tape was readily peeled manually without noise and "x" (poor release) when the adhesive tape was peeled with noise or manually peeled with a heavy feel.

Comparative Example 4

This is a reference. A white paper board (base paper) having a basis weight of 350 g/m$^2$ without coating of the silicone base water- and oil-repellent composition was examined as in Example 5.

Comparative Example 5

A coated paper sample was prepared as in Example 5 except that an aqueous silicone resin emulsion without component (d) was prepared and used as a silicone base water- and oil-repellent composition with 50% of effective components. It was similarly tested.

TABLE 2

| Test | Example | Comparative Example | |
|---|---|---|---|
|  | 5 | 4 | 5 |
| Oil resistance of planar portion | 10 | 0 | 8 |
| Oil resistance of folded portion | 9 | 0 | 6 |
| Water repellency of planar portion | R9 | R0 | R7 |
| Water repellency of folded portion | R8 | R0 | R6 |
| Release | ○ | X | ○ |

It is seen from Table 2 that the water- and oil-repellent paper sheet of the invention exhibits excellent oil resistance, water repellency and release property. The values of a folded portion are comparable to those of a planar portion. Only minimal losses of oil resistance and water repellency occur when folded.

Japanese Patent Application Nos. 2006-279800 and 2006-279815 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A water- and oil-repellent paper sheet having improved fold resistance, said paper sheet comprising a paper substrate and a water- and oil-repellent, releasable silicone resin layer on at least one surface of the paper substrate,
said paper sheet including a planar portion normally and a folded portion when folded,
the planar portion exhibiting an oil resistance which is at least 9 in Kit value and the folded portion exhibiting an oil resistance which is at least 8 in Kit value, both as measured at 20° C. and a humidity 50% by J. TAPPI paper/pulp test No. 41-83, and
the planar portion exhibiting a water repellency which is at least R8 and the folded portion exhibiting a water repellency which is at least R7, both as measured by J. TAPPI paper/pulp test No. 68:2000,
said silicone resin layer us formed by coating a water- and oil-repellent composition on the surface of the paper substrate, said composition primarily comprising an aqueous silicone resin emulsion comprising:
(a) 100 parts by weight of an organopolysiloxane containing at least two-silicon-bonded hydroxyl groups in a molecule,
(b) 0.5 to 20 parts by weight of dicarboxylic acid base curing agent,
(c) 1 to 50 parts by weight of silica,
(d) 2 to 4 parts by weight of an organopolysiloxane containing long-chain alkyl and alkoxy groups, but free of hydroxyl; groups, and having the average compositional formula (3):

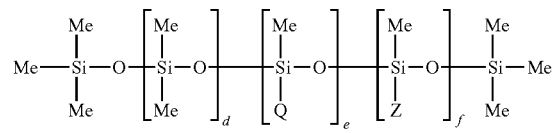

(3)

wherein Q is each independently selected from hexyl, octyl, decyl, and dodecyl, Z is each independently selected from methoxy, ethoxy and $-C_2H_4-Si(OCH_3)_3$, the subscript d is a positive number of 1 to 100, e is a positive number of 1 to 100, and f is a positive number of 0.1 to 30, and (e) a surfactant in an effective amount to keep components (a)-(d) in emulsion form.

2. The water- and oil-repellent paper sheet of claim 1, wherein the water- and oil-repellent paper sheet is used in food packages and wrappers including base paper, wrappers for chocolate and snacks, paper boxes and bags for fried potato, fried chicken, doughnuts, crackers and cakes, and wrappers for hamburgers and fried items.

3. The water- and oil-repellent paper sheet of claim 1, wherein the paper substrate is selected from the group consisting of Kraft paper, wood-free paper, paper board, liner, glassine paper and parchment paper.

\* \* \* \* \*